United States Patent
Freire et al.

(10) Patent No.: US 11,365,717 B2
(45) Date of Patent: *Jun. 21, 2022

(54) HARMONIC CONTROL OF A CONVERTER

(71) Applicant: Siemens Gamesa Renewable Energy A/S, Brande (DK)

(72) Inventors: Nuno Miguel Amaral Freire, Brande (DK); Zhan-Yuan Wu, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 29 days.

This patent is subject to a terminal disclaimer.

(21) Appl. No.: 16/788,706

(22) Filed: Feb. 12, 2020

(65) Prior Publication Data

US 2020/0256315 A1    Aug. 13, 2020

(30) Foreign Application Priority Data

Feb. 13, 2019   (EP) .................................... 19156889

(51) Int. Cl.
   *H02P 21/05*       (2006.01)
   *F03D 7/02*        (2006.01)
   (Continued)

(52) U.S. Cl.
   CPC .............. *F03D 7/0272* (2013.01); *F03D 9/25* (2016.05); *H02P 21/0003* (2013.01);
   (Continued)

(58) Field of Classification Search
   CPC ...... H02P 21/05; H02P 21/0003; H02P 29/50; H02P 2101/15; H02P 21/22; F05B 2270/10
   See application file for complete search history.

(56) References Cited

U.S. PATENT DOCUMENTS 7,847,526 B2 * 12/2010 Tan .......................... H02P 21/22
                                                        322/46
7,982,326 B2 *  7/2011 Tan .......................... H02P 9/42
                                                        290/44
(Continued)

FOREIGN PATENT DOCUMENTS

CN      108808704 A      11/2018
DE   102016217887 A1      3/2018
(Continued)

OTHER PUBLICATIONS

Extended European Search Report in related European Patent Application No. 19156889.8, dated Jun. 12, 2019. 8 pages.

*Primary Examiner* — Rina I Duda
(74) *Attorney, Agent, or Firm* — Schmeiser, Olsen & Watts LLP

(57) ABSTRACT

An arrangement for determining an operation parameter reference for controlling a generator side converter portion coupled to a generator is provided, including: at least one arithmetic element configured to derive at least one harmonic current error by subtracting a generator output current from at least one harmonic current reference; at least one harmonic current controller configured to determine at least one harmonic reference current deviation based on the harmonic current error; another arithmetic element configured to derive a fundamental current error by subtracting the generator output current from a sum of a fundamental current reference and the at least one harmonic current reference; still another arithmetic element configured to determine a modified fundamental current error as a sum of the fundamental current error and the harmonic reference current deviation; a fundamental current controller adapted to determine the operation parameter reference based on the modified fundamental current error.

14 Claims, 4 Drawing Sheets

(51) Int. Cl.
  *F03D 9/25* (2016.01)
  *H02P 21/00* (2016.01)
  *H02P 29/50* (2016.01)
  *H02P 101/15* (2016.01)

(52) U.S. Cl.
  CPC .............. *H02P 21/05* (2013.01); *H02P 29/50* (2016.02); *F05B 2270/10* (2013.01); *H02P 2101/15* (2015.01)

(56) References Cited

U.S. PATENT DOCUMENTS

| | | | |
|---|---|---|---|
| 2011/0245990 A1* | 10/2011 | Rasmussen | H02J 3/46 700/298 |
| 2014/0008912 A1* | 1/2014 | Gupta | F03D 9/255 290/44 |
| 2014/0021894 A1 | 1/2014 | Simili | |
| 2016/0290320 A1* | 10/2016 | Deng | H02P 9/42 |
| 2019/0273457 A1 | 9/2019 | Deng et al. | |

FOREIGN PATENT DOCUMENTS

| | | |
|---|---|---|
| EP | 2043255 A2 | 4/2009 |
| EP | 2485388 A1 | 8/2012 |
| EP | 2750270 A1 | 7/2014 |
| EP | 3264593 A1 | 1/2018 |

* cited by examiner

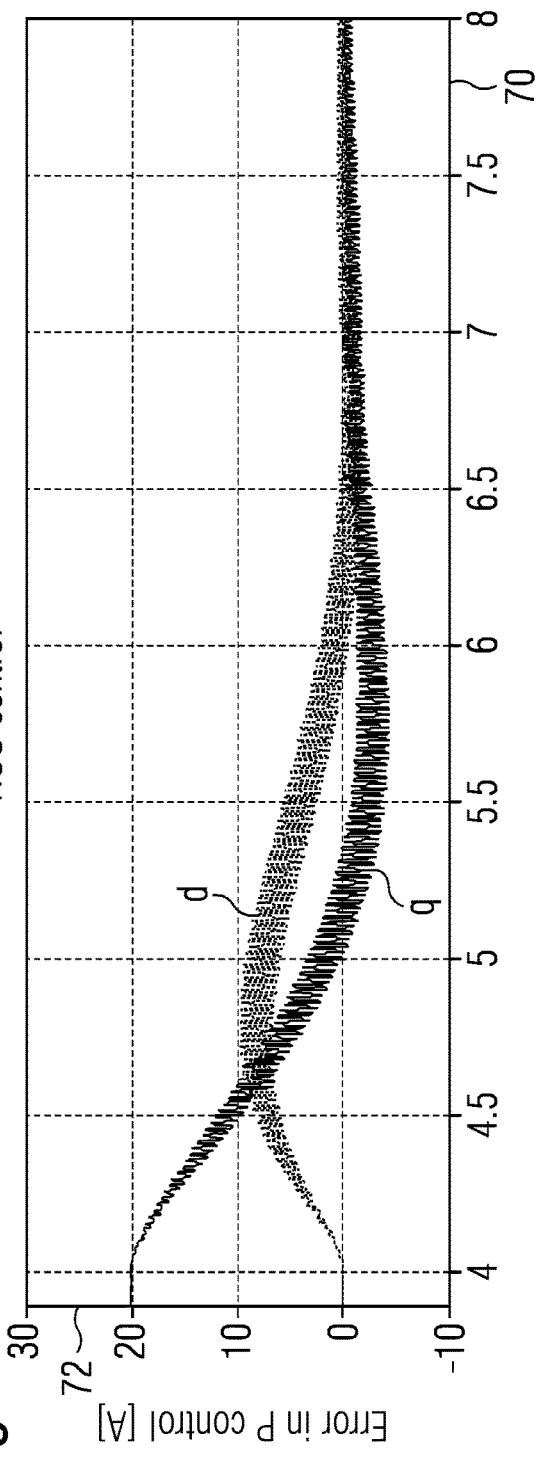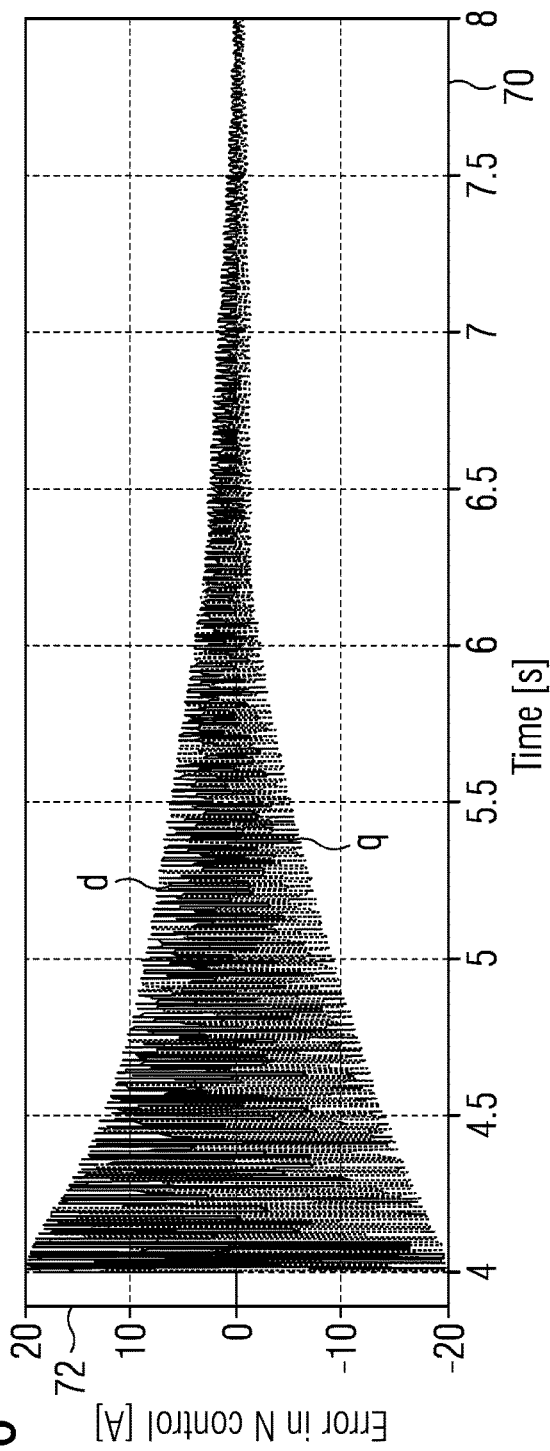

HARMONIC CONTROL OF A CONVERTER

CROSS-REFERENCE TO RELATED APPLICATIONS

This application claims priority to European Patent Application No. EP 19156889.8, having a filing date of Feb. 13, 2019, the entire contents of which are hereby incorporated by reference.

FIELD OF THE TECHNOLOGY

The following relates to an arrangement and to a method for determining an operation parameter reference for controlling a generator side converter portion coupled to a generator, in particular of a wind turbine. Further, the following relates to an electric energy system comprising the arrangement and further relates to a wind turbine comprising the electric energy system. In particular, the following relates to a control method intended to improve the performance of a harmonic control in vector-controlled drives, namely, the control of permanent magnet synchronous generators used in wind turbine applications.

BACKGROUND

Harmonic control, in particular in permanent magnet generators, may be required in order to control noise and vibration as well as to increase system efficiency. Harmonic control may in particular be applied to direct drive generators which do not have a gearbox in the drive train. Conventionally, a fundamental current controller and a harmonic current controller may be utilized in a vector controlled drive.

However, the coexistence of a fundamental current controller (FCC) and a harmonic current controller (HCC) in a vector-controlled drive may bring some control issues such as high control effort, poor dynamic performance, and instabilities.

Concerning harmonic current control, additional controllers may conventionally be added in parallel with a fundamental current controller to provide the final control voltage to a converter drive. However, good performance is not achievable for lower harmonic orders (for example: 2f), showing very slow dynamics. This would have a negative impact to the turbine performance when it goes through the variation in speed and power as wind changes.

It should be noted that the presence of 2f harmonic is common in a large generator with segmented stator, and the 2f harmonic level can be significantly increased when the generator is operated in a fault-tolerant mode. A common attempt to improve transient performance of a controller is to add a feed-forward path, which based on a machine model determines the voltage demand to achieve a given current reference. This approach is difficult to realize for harmonic current control because a large number of parameters depending on load and rotor position need to be known accurately. Simulation results show that little improvement can be achieved.

Thus, there may be a need for an arrangement and for a method for determining an operation parameter reference for controlling a generator side converter portion coupled to a generator, wherein at least some of the above-mentioned issues are addressed, wherein in particular a simple solution having sufficient system stability is achieved. In particular improvements with focus on fast control of low harmonic frequencies may be desired.

SUMMARY

Embodiments of the present invention may in particular be applied for the harmonic control in vector-controlled drives, namely the control of permanent magnet synchronous generators used in for example wind turbine applications.

According to an embodiment of the present invention it is provided an arrangement for determining an operation parameter reference for controlling a generator side converter portion coupled to a generator, in particular of a wind turbine, the arrangement comprising: at least one arithmetic element configured to derive at least one harmonic current error by subtracting a generator output current from at least one harmonic current reference; at least one harmonic current controller configured to determine at least one harmonic reference current deviation based on the harmonic current error; another arithmetic element configured to derive a fundamental current error by subtracting the generator output current from a sum of a fundamental current reference and the at least one harmonic current reference; still another arithmetic element configured to determine a modified fundamental current error as a sum of the fundamental current error and the harmonic reference current deviation; a fundamental current controller adapted to determine the operation parameter reference based on the modified fundamental current error.

The arrangement may be part of a wind turbine controller, such as implemented in software and/or hardware. The operation parameter reference may be a reference value of an operation parameter of the generator. The operation parameter may at least partly define the operation of the generator, for example regarding its electrical output, its mechanical or electrical rotational speed, the generated torque or the like. In particular, the operation parameter reference may be a voltage reference which may be supplied to the generator side converter portion (of a for example AC-DC-AC converter) for actually controlling the generator side converter portion, in particular after having determined, from the operation parameter reference, pulse width modulation signals suitable for being supplied to gates of controllable switches in the converter portion.

The generator output current may have been measured. The fundamental current reference and also at least one harmonic current reference may be determined or defined in a number of ways. The fundamental current reference and the harmonic current reference may for example just be a constant or may be derived by looking up a look-up table or the like. In other embodiments, the fundamental current reference and/or harmonic current reference may depend on the operation parameter reference itself, may depend on the generator output current and may also depend on a DC voltage of a DC link between the generator side converter portion and a grid side converter portion.

The converter may for example be or comprise a AC-DC-AC converter which may be configured to convert a variable frequency output power provided by the generator to a substantially DC power at the DC link and from the DC power to a fixed frequency AC output power, for example having a frequency of 50 Hz or 60 Hz.

The arrangement may be configured to control (in particular concurrently) at least one or two or three or four or even more harmonics of a fundamental frequency of the operation parameter by deriving multiple harmonic current errors (from generator current and respective harmonic references) and providing multiple harmonic current controllers. All respective harmonic reference current deviations (as derived by the respective harmonic current controllers) may be added to the fundamental current error to derive the modified fundamental current error which may then be supplied to the fundamental current controller.

All harmonic current references, regarding all different harmonics to be controlled, for example a second, a fourth, a sixth, an eighth, and/or a twelfth harmonics may be considered. For each of the harmonics to be controlled, a corresponding harmonic current controller may be comprised in the arrangement which is configured to handle the particular harmonic, such as e.g. a second, a fourth, a sixth, an eighth or a twelfth harmonic of the fundamental electrical frequency of the generator.

The generator output current (or the current error) may be bandpass-filtered (passing through the harmonics under consideration) before being subtracted from the respective harmonic current reference.

In general, the fundamental current controller (and the harmonic current controller) may comprise PI-controllers which may be configured such that they produce output signals which, when supplied as operational parameter reference to the converter portion, lead to a decrease of the errors (i.e. the fundamental current error and the harmonic current error, respectively). Thereby, the control may in particular be applied in the fundamental dq-frame within the fundamental current controller and may be applied in the respective harmonic dq-frame in the respective harmonic current controller. Embodiments of the present invention support a respective control of the converter generator portion in order to eliminate one or more of undesired harmonic(s) or may also enable to achieve particular levels of particular harmonics at the output of the generator which levels may not be zero. Thereby, an effective control which may be implemented in a simple manner and a reliable stable operation may be provided.

According to an embodiment of the present invention, the operation parameter reference is a voltage reference or a power reference or a rotational speed reference or a torque reference for controlling the generator side converter portion. Thereby, a voltage control, a power control, a speed control, or a torque control may be applied. Thus, conventional control methods may be supported by the arrangement.

According to an embodiment of the present invention, the harmonic current reference comprises an oscillation corresponding to N times a fundamental electrical frequency of the generator, wherein N is a natural number larger than one, in particular being 2 or 4 or 6 or 8 or 12, wherein the harmonic current reference is in particular different from zero.

The fundamental electrical frequency of the generator may be derived based on the rotational speed of the generator and taking into account the number of poles and/or number of permanent magnets. Several different harmonics may be controlled by the arrangement by providing for each harmonics to be controlled a respective harmonic current controller. Each of the harmonic current controllers may receive as input a difference between the respective harmonic current reference and the filtered (e.g. bandpass for the respective harmonic) version of the generator output current. All outputs, i.e. the harmonic reference current deviations for the different harmonics may later be summed and added to the fundamental current error to arrive at the modified fundamental current error. Thus, a flexible control may be provided.

According to an embodiment of the present invention, the operational parameter reference and/or fundamental current error and/or harmonic current reference and/or harmonic reference current deviation are given in a fundamental dq-frame rotating with the fundamental electrical frequency of the generator. The fundamental dq-frame rotates with the fundamental frequency of the generator. Thereby, processing the quantities may be performed in a simple manner.

According to an embodiment of the present invention, the fundamental current controller comprises two PI-controller, to determine the operation parameter reference, using for each of the d-component and the q-component of the modified fundamental current error in the fundamental dq-frame one PI-controller of the two PI-controllers.

The harmonic current controller may be comprised of four PI controllers, two for the positive sequence harmonic dq-frame (rotating with the harmonic frequency in forward direction) as already mentioned, and the other two for the negative sequence harmonic dq-frame (rotating with the harmonic frequency in backward direction).

The PI-controller(s) may each comprise a proportional branch and an integral branch each receiving the respective current error as input. The outputs of the two branches are respectively added together for each of the d-component and the q-component in the fundamental dq-frame. Thereby, conventionally available controllers may be utilized in embodiments according to the embodiment of the present invention.

According to an embodiment of the present invention, the harmonic current controller comprises: a transformation module configured to transform the harmonic current error in the fundamental dq-frame into a harmonic dq-frame (e.g. in two separate positive and negative directions), the harmonic dq-frame rotating with the respective multiple of the fundamental frequency; two PI-controllers configured to receive the components of the harmonic current error in the harmonic positive sequence dq-frame as inputs; two other PI-controllers configured to receive the components of the harmonic current error in the harmonic negative sequence dq-frame as inputs; a backtransformation module configured to backtransform the outputs of the PI-controllers and the outputs of the other PI-controllers into the fundamental dq-frame; and an addition element for adding the transformed outputs of the PI-controllers and the transformed outputs of the other PI-controllers to obtain the harmonic reference current deviation.

The harmonic dq-frame rotates with the respective multiple of the fundamental frequency corresponding to the harmonic to be controlled. After transforming the harmonic current error into the harmonic dq-frame, the corresponding error may substantially be a DC value. Thereby, calculations and the control may be simplified.

According to an embodiment of the present invention, the arrangement further comprises an electrical speed estimator configured and connected to estimate an electrical rotational speed and/or an electrical angle of the generator based on the generator output current and in particular further based on the operation parameter reference such as reference voltage.

Thus, measuring the mechanical speed/frequency may not be necessary, thereby simplifying the method.

According to an embodiment of the present invention, the fundamental current controller and/or the harmonic current controller receives as input the electrical rotational speed (or frequency) and/or an electrical angle estimated by the electrical speed estimator. The electrical rotational speed and the electrical angle may be required for performing the control and in particular to perform a transformation into the harmonic dq-frame.

According to an embodiment of the present invention, the arrangement further comprises at least one harmonic current reference calculation module configured to calculate the harmonic current reference based on at least one current reference input; and/or a fundamental current reference calculation module configured to calculate the fundamental current reference based on at least one of the current reference input, wherein the current reference input comprises: the operation parameter reference, in particular voltage reference, and/or the generator output current, and/or a DC-link voltage, and/or an electrical frequency of the generator, and/or an electrical angle of the generator, and/or a torque, and/or an acceleration and/or a sound pressure.

The reference calculation modules are optional and may be missing in other embodiments. The current references may be simply constants supplied to the arrangement. Depending on which quantity is controlled (for example voltage, power, torque), the respective current reference calculation modules may be configured differently, in particular regarding the configuration, such as look-up tables or the like. For each harmonic to be controlled, a respective harmonic current reference calculation module may be provided.

According to an embodiment of the present invention, the arrangement further comprises a dq-abc-transformation module configured to transform the operation parameter reference given in the fundamental dq-frame into a stator frame; a modulator configured to derive pulse width modulation signals based on the operation parameter reference given in the stator frame and connected to supply the pulse width modulation signals to gates of controllable switches comprised in the generator side converter portion. Thereby, conventional pulse width modulation control methods are supported.

According to an embodiment of the present invention, the arrangement further comprises an abc-dq-transformation module configured to transform the generator output current in the stator frame into the fundamental dq-frame. Thereby, the output current of the generator may conveniently be subtracted from the current references before supplying the difference to the respective harmonic current controller and the fundamental current controller.

According to an embodiment of the present invention it is provided an electric energy system, comprising: a generator; a converter comprising a generator side converter portion coupled to the generator; and an arrangement according to one of the preceding embodiments.

The converter may further comprise a grid side converter portion which may be connected to a utility grid to which electric energy is output from the electric energy system.

Furthermore, a wind turbine comprising the electric energy system is provided which may comprise a wind turbine tower, a nacelle provided on top of the wind turbine tower, wherein the generator and the converter and also the arrangement may be arranged e.g. within the nacelle or in another component of the wind turbine.

It should be understood that features, individually or in any combination, disclosed, explained, provided or applied for an arrangement for determining an operation parameter reference for controlling a generator side converter portion may also be applied, individually or in any combination, to a method for determining an operation parameter reference for controlling a generator side converter portion according to embodiments of the present invention and vice versa.

According to an embodiment of the present invention it is provided a method for determining an operation parameter reference for controlling a generator side converter portion coupled to a generator, in particular of a wind turbine, the method comprising: deriving at least one harmonic current error by subtracting a generator output current from at least one harmonic current reference; determining at least one harmonic reference current deviation based on the at least one harmonic current error; deriving a fundamental current error by subtracting the generator output current from a sum of a fundamental current reference and the at least one harmonic current reference; determining a modified fundamental current error as a sum of the fundamental current error and the harmonic reference current deviation; determining the operation parameter reference based on the modified fundamental current error.

Furthermore, it is provided a method for controlling a generator side converter portion coupled to a generator, comprising: performing a method for determining an operation parameter reference according to the preceding embodiment and controlling the generator side converter portion coupled to a generator based on the operation parameter reference.

Embodiments of the present invention are now described with reference to the accompanying drawings. The embodiment is not restricted to the illustrated or described embodiments.

The aspects defined above and further aspects of the embodiment of the present invention are apparent from the examples of embodiment to be described hereinafter and are explained with reference to the examples of embodiment. The embodiment will be described in more detail hereinafter with reference to examples of embodiment but to which the embodiment is not limited.

BRIEF DESCRIPTION

Some of the embodiments will be described in detail, with reference to the following figures, wherein like designations denote like members, wherein:

FIG. 1 schematically illustrates a wind turbine comprising an arrangement according to an embodiment of the present invention;

FIG. 2 schematically illustrates a block diagram of an arrangement as comprised in an electric energy system according to an embodiment of the present invention;

FIG. 5 is a graph illustrating control performance of a conventional system; and FIG. 6 is a graph illustrating control performance of a conventional system.

DETAILED DESCRIPTION

Figure 1:
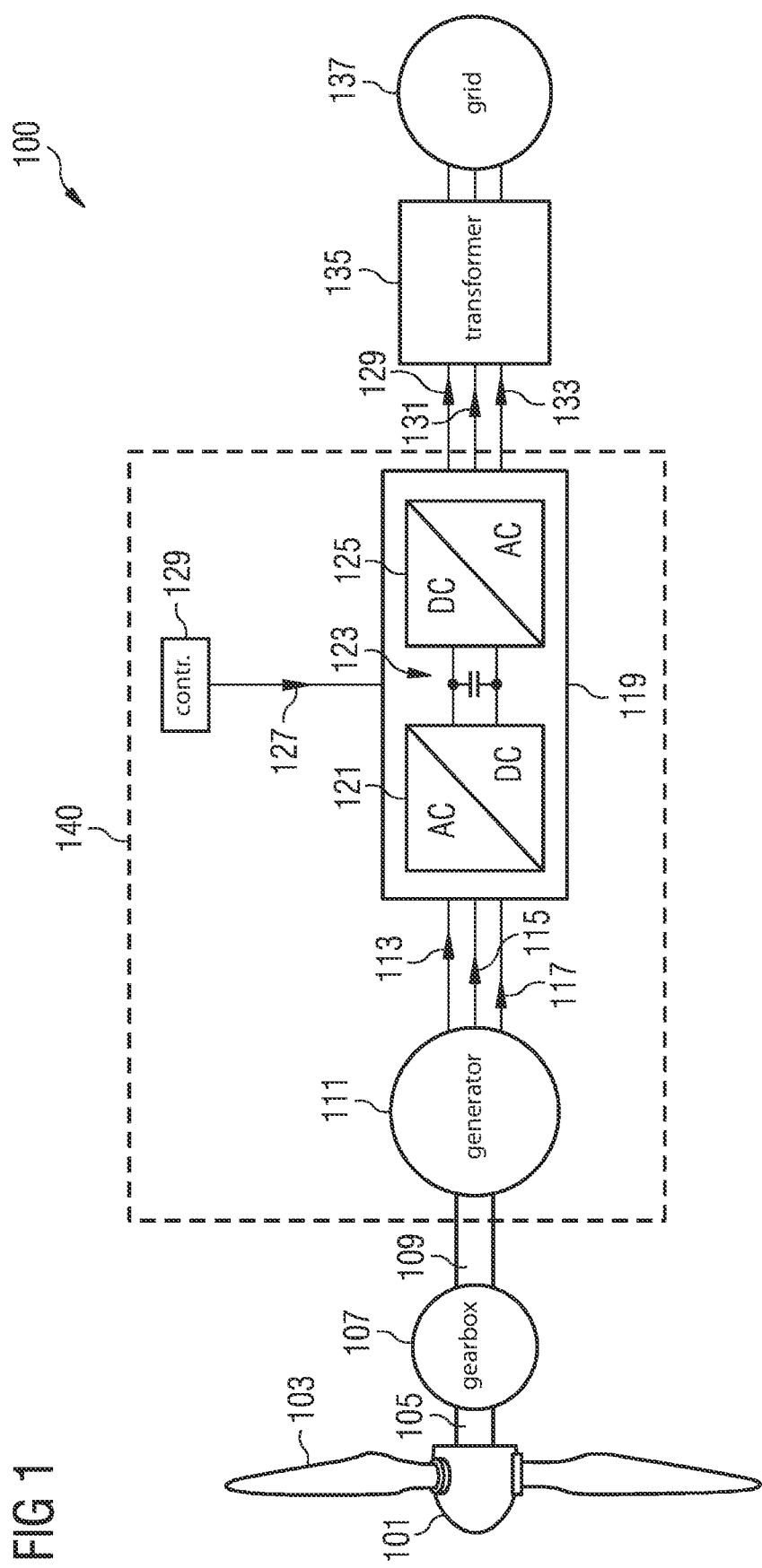

The illustration in the drawings is in schematic form. It is noted that in different figures, similar or identical elements are provided with the same reference signs or with reference signs, which are different from the corresponding reference signs only within the first digit.

The wind turbine 100 schematically illustrated in FIG. 1 comprises a hub 101 at which plural rotor blades 103 are connected. The hub is connected with a primary shaft 105 which is mechanically connected to an (optional) gearbox 107. A secondary shaft 109 also mechanically coupled to the gearbox 107 drives a generator 111 having a not illustrated stator with one or more winding sets (in particular two winding set,) and having a rotor with permanent magnets being connected to the secondary shaft 109. Upon rotation of the secondary shaft 109 and the rotor with the permanent magnets comprised in the generator 111, electric energy is generated by the generator 111 and is output by a three-phase power stream 113, 115, 117. The power stream is a variable frequency power stream due to the variable rotational speed of the rotation of the hub 101 including the rotor blades 103.

Therefore, the wind turbine 100 comprises an AC-DC-AC converter 119 which comprises a generator side converter portion 121, a DC link 123 and a grid side converter portion 125. The generator side converter portion 121 is in particular configured as an AC-DC converter and the grid side converter portion 125 is configured as a DC-AC converter portion. The conversions in the portions 121, 125 are achieved by controlling plural controllable switches using pulse width modulation signals which are derived based on an operation parameter reference 127 which is supplied from a wind turbine controller 129 which may comprise an arrangement for determining an operation parameter reference for controlling a generator side converter portion according to an embodiment of the present invention and which will be described in more detail with reference to FIG. 2 below.

The variable frequency output power 113, 115, 117 is converted by the generator side converter portion 121 to a substantially DC output power at the DC link 123 and is then converted to a fixed frequency output power 129, 131, 133 by the grid side converter portion 125. The output power is supplied to a (optional) transformer 135 which transforms the output voltage to a higher voltage before supplying the output power to the utility grid 137. The wind turbine 100 comprises the electric energy system 140 according to an embodiment of the present invention. For controlling the converter 119 receives control signals 127, comprising an operation parameter reference from the arrangement 129.

Figure 2:
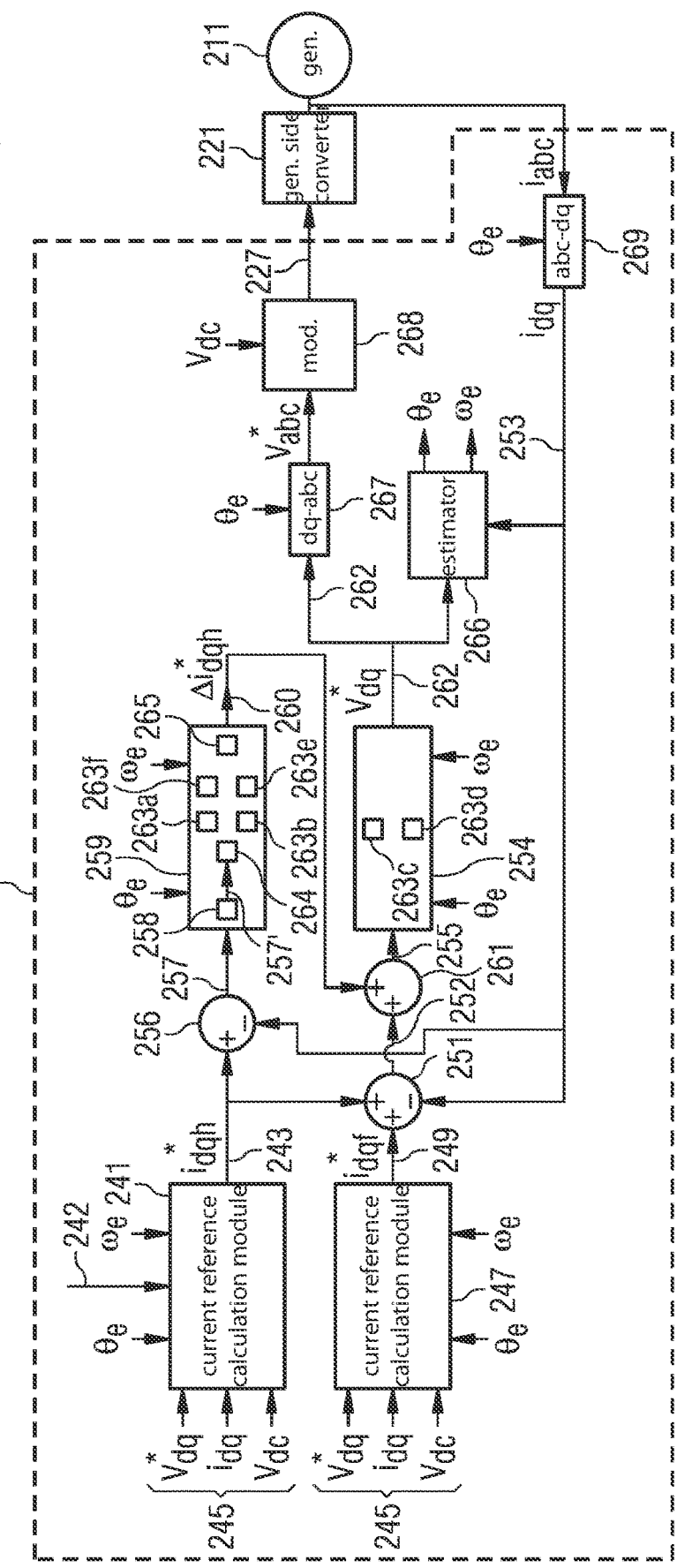

FIG. 2 schematically illustrates an electric energy system 240 according to an embodiment of the present invention comprising an arrangement 229 according to an embodiment of the present invention (which may represent arrangement 129 in FIG. 1) for determining an operation parameter reference for controlling a generator side converter portion 221 coupled to a generator 211.

Thereby, the arrangement 229 comprises at least one harmonic current reference calculation module 241 configured to calculate a harmonic current reference 243 (i*dqh) based on at least one current reference input 245, for example a voltage reference v*dq, the generator output current idq and the DC link voltage Vdc.

Furthermore, the arrangement 229 comprises a fundamental current reference calculation module 247 which is configured to calculate a fundamental current reference 249 (i*dqf) based on at least one of the current reference input 245. Alternatively, other inputs 245 may be provided. Furthermore, the current reference calculation modules 241 and 247 receive the electrical frequency ω e and the electrical position Θe of the generator and/or may optionally receive input 242 for torque and/or acceleration and/or sound pressure. The input 242 may be relevant when aiming to reach closed-loop control of torque ripple for instance.

The arrangement 229 further comprises an arithmetic element 251 which is configured to derive a fundamental current error 252 by subtracting an (unfiltered) generator output current 253 ($i_{dq}$) from a sum of a fundamental current reference 249 and at least one harmonic current reference 243.

Further, the arrangement comprises a fundamental current controller 254 adapted to determine an operation parameter reference 262 (in this case a voltage reference v*$_{dq}$) based on a modified fundamental current error 255 derived as described below.

The arrangement 229 further comprises at least one other arithmetic element 256 configured to derive at least one harmonic current error 257 by subtracting a generator output current 253 from at least one harmonic current reference 243.

The arrangement 229 further comprises at least one harmonic current controller 259 configured to determine at least one harmonic reference current deviation 260 (Δi*$_{dqh}$) based on the harmonic current error 257.

Further, still another arithmetic element 261 is configured to determine the modified fundamental current error 255 as a sum of the fundamental current error 252 and the harmonic reference current deviation 260.

If more than one harmonic is to be controlled by the arrangement 229, the arrangement comprises further harmonic current reference calculation module(s) and harmonic current controller(s) for the different harmonics. The modified fundamental current error 255 is then derived as a sum of the fundamental current error 252 and the all harmonic reference current deviations as output from all harmonic current controllers.

In the illustrated embodiment, the operation parameter reference 262 relates to a voltage reference. In other embodiments, a power reference, a rotational speed reference or a torque reference may be derived within the arrangement 229.

As can be taken from the subscripts used in the method scheme or block scheme illustrated in FIG. 2, the electrical quantities are frequently given in components of a dq-frame rotating with the fundamental electrical frequency of the generator. The fundamental current controller 254 (as well as the harmonic current controller 259 each) comprises two PI-controllers 263c, 263d (in other embodiments four PI controllers) for the d-component and the q-component. The (each) harmonic current controller 259 comprises four PI-controllers 263a, 263b, 263e, 263f.

In embodiments, both fundamental current controller and/or harmonic current controller may have up to four PI controllers, two for +dq (positive sequence) and two for −dq (negative sequence). Furthermore, the harmonic current controller comprises a bandpass filter 258 (for filtering out undesired frequencies) and a transformation module 264 which is configured to transform the (filtered) harmonic current error 257' given in the fundamental dq-frame into a harmonic dq-frame and supplying the transformed signal to the two (in other embodiments four, two for the dq+ sequence and two for the dq-sequence) PI-controllers 263a, 263b for the d- and q-components.

The PI controllers 263a, 263b, 263c, 263d, 263e, 263f for the harmonic current controller and the fundamental current controller, respectively, may have the same structure, but their parameter setting may be commonly different.

The harmonic current controller 259 further comprises a backtransformation module 265 configured to backtransform the outputs of the PI-controllers 263a, 263b and the outputs of the other PI-controllers 263e, 263f into the fundamental dq-frame and to add all transformed signals together, in order to determine the harmonic reference current deviation 260, Δi*dqh.

The arrangement 229 further comprises an electrical speed estimator 266 configured and connected to estimate an electrical rotational speed $\omega_e$ and/or an electrical angle $\Theta_e$ of the generator 211 based on the generator output current $i_{abc}$ (253) and further based on the fundamental operation parameter reference 255 (v*$_{dq}$). Also, the fundamental current controller 254 and the harmonic current controller 259 both receive the electrical rotational speed ω$_e$ and the electrical angle Θ$_e$ as inputs, as estimated by the electrical speed estimator 266.

The arrangement 229 further comprises a dq-abc-transformation module 267 configured to transform the operation parameter reference 262 given in the fundamental dq-frame into a stator frame, i.e. into the quantity v*$_{abc}$. Furthermore, a modulator 268 is provided for deriving pulse width modulation signals 227 based on the operation parameter reference v*$_{abc}$ or based on the operation parameter reference in another frame, such as in the dq-frame as 262 (v*$_{dq}$). The modulator 268 is connected to supply the pulse width modulation signals 227 to gates of controllable switches comprised in the generator side converter portion 221.

The arrangement 229 further comprises an abc-dq transformation module 269 configured to transform the generator output current i$_{abc}$ in the stator frame into the fundamental dq-frame as signal 253 (i$_{dq}$).

The electric energy system 240 may for example be comprised in the wind turbine 100 as illustrated in FIG. 1 as energy system 140.

The arrangement 229 is adapted to perform a method for determining an operation parameter reference for controlling a generator side converter portion according to an embodiment of the present invention.

Methods and arrangements according to embodiments of the present invention are capable to be applied to both single and multiple harmonic current controller loops, i.e. control of multiple current harmonic orders.

Accordingly, harmonic reference current may be expressed as I*dqh=I*dqh1+I*dqh2+ . . . +I*dqhn, wherein h1 to hn stand for the harmonic order of interest (typically, second, fourth, sixth, eighth and twelfth harmonics). Consequently, the harmonic current controller block may be composed of multiple control loops in the respective reference frames which is not explicitly shown in FIG. 2 for sake of clarity.

The fundamental current references as derived by the fundamental current reference calculation module 247 may typically be calculated by means of controllers or look-up tables, some examples may be speed, power, torque, flux, and voltage controllers, and maximum torque per ampere methods. Such controllers may provide i*dqf which are usually DC signals during steady-state operation.

The harmonic current reference calculation module 241 may target to control harmonic levels in given quantities (torque, power, voltage, flux, sound pressure, accelerations) and its output may be a sinusoidal signal varying at given frequency or a combination of sinusoidal signals with different frequencies (idqh). It may be composed of a variety of controllers (PI, search algorithms, etc.) and/or LUTs, i.e. look-up tables.

The fundamental current controller 254 may be composed of two PI-controllers in the positive synchronous reference frame and decoupling feedforward terms. Optionally, a pair of negative sequence current controllers may be included too, whose implementation details are not shown for the sake of simplicity.

The harmonic current controller 259 may be implemented by means of PI-controllers in harmonic reference frame, proportional-resonant controllers in fundamental reference frame, or any other suitable method.

The transformations between the abc frame and the synchronous dq frame, i.e. module 267, may apply the well-known inverse Park transformation and module 269 may apply the Park transformation.

The voltage modulator 268 may use the reference voltages in the abc frame for generating pulse width modulation patterns or signals. The pulse width modulation signals may then be used to control power electronic switches (such as IGBTs) in the generator side converter 221.

The speed observer 266 may typically be or comprise a back-emf based observer, allowing to estimate rotor position and speed.

The bandpass filter 258 may be tuned for the specific harmonic frequencies which are to be controlled or which are of interest. The filter may be used to attenuate/remove undesired harmonics from measured currents and fundamental reference voltages, for instance, adaptive notch filters. The bandpass filter 258 is specific for the considered harmonic, in order to attenuate frequency components different from the considered harmonic.

According to an embodiment of the present invention it is proposed to modify the control structure in order to have the harmonic current controller (HCC) in series with the fundamental current controller (FCC) (see FIG. 2), instead of HCC in parallel with FCC. This change is possible while keeping the implementation of all core control strategies unchanged, and the validated parameters for fundamental control retained. Differently from the parallel implementation of HCC, the series HCC generates additional harmonic current references instead of voltages references. This functions to compensate for the delay and/or attenuation introduced by the FCC when FCC attempts to control a given harmonic in the fundamental synchronous reference frame. In the series HCC control scheme, the HCC and FCC controllers are working together, and the risk of possible negative interactions between them as in the parallel HCC method is minimised.

As a consequence, the dynamic performance in both reference tracking and disturbance rejection will be improved, and additionally the control effort of HCC will be lowered. Moreover, the series HCC generates dq currents which as opposed to dq voltages are decoupled, aiding to the further improvement of transient performance with lack of need for decoupling loops.

Frequency domain analysis of the series HCC shows that the closed-loop poles are shifted more negatively in the left half plane. This will not only enhance the control stability margin, but also improve the dynamic performance of harmonic control, i.e., better reference tracking and disturbance rejection.

Figure 3:
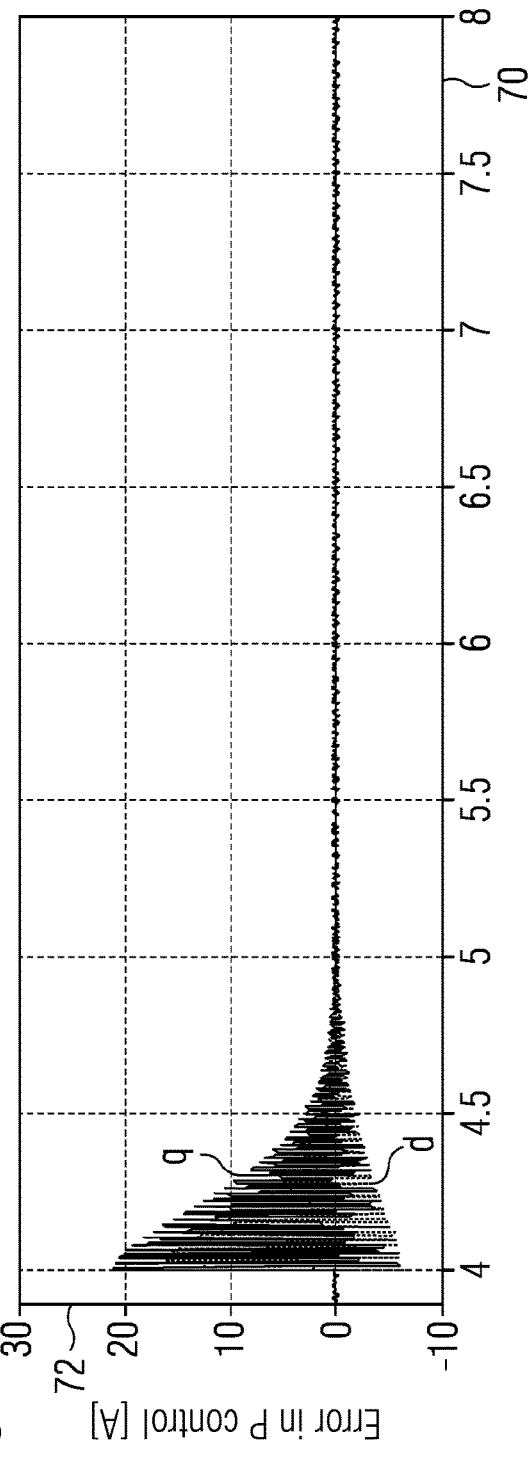
FIG. 3 is a graph illustrating control performance as considered in an embodiment of the present invention.
Figure 4:
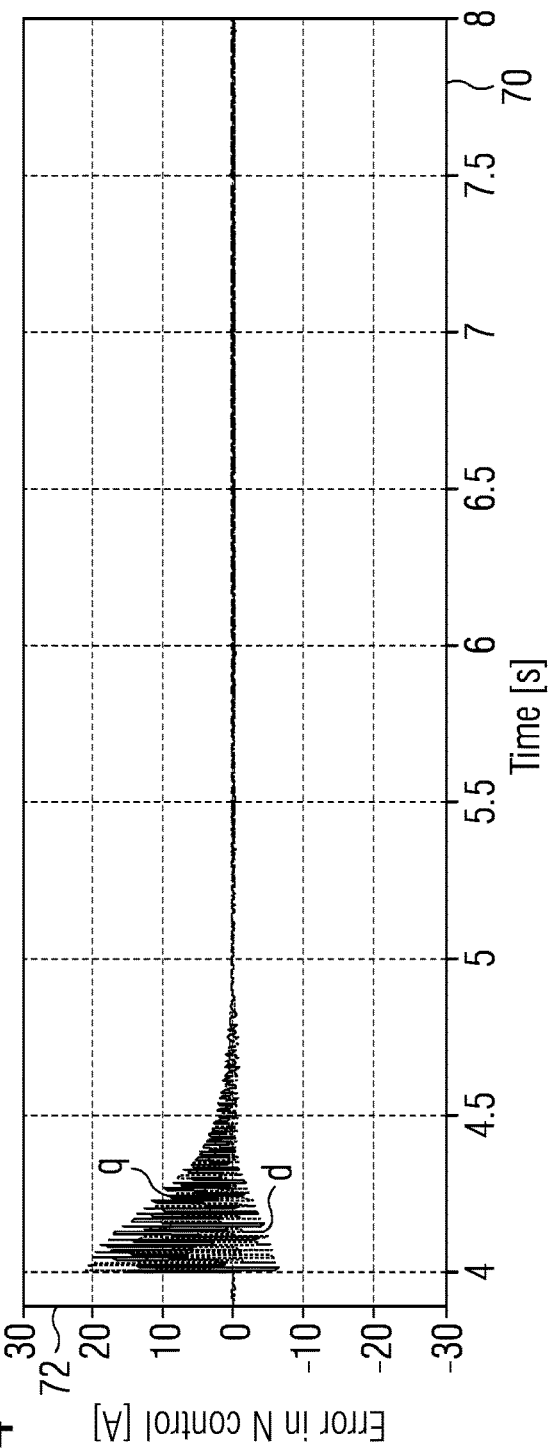
FIG. 4 is a graph illustrating control performance as considered in an embodiment of the present invention.

Transient performance according to embodiments of the present invention was evaluated in the time domain as shown in FIGS. 3 and 4 (curves for the d- and the q-component of the respective error are shown) that can be compared with performance according to a conventional parallel architecture shown in FIGS. 5 and 6. Thereby abscissas 70 denote time, while ordinates 72 denote error in P control in FIG. 3, 5 and in N control in FIG. 4, 6.

Time domain simulation results for step response introduced at t=4 s are shown, controller input errors for positive and negative sequences (2f control): FIG. 5, 6 show the results for parallel HCC with settling time of 4 s; FIG. 3, 4 show results for series HCC with settling time of 0.8 s.

As can be taken from FIGS. 3 to 5, a drastic reduction of the settling time of the errors from 4 s to 0.8 s is achieved, when the parallel HCC is replaced with the series HCC control according to embodiments of the present invention.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the present invention has been disclosed in the form of preferred embodiments and variations thereon, it will be understood that numerous additional modifications and variations could be made thereto without departing from the scope of the invention.

What is claimed:

1. An arrangement for determining an operation parameter reference for controlling a generator side converter portion coupled to a generator of a wind turbine, the arrangement comprising:
   a first arithmetic element configured to derive at least one harmonic current error by subtracting a generator output current from at least one harmonic current reference;
   at least one harmonic current controller configured to determine at least one harmonic reference current deviation based on the at least one harmonic current error;
   a second arithmetic element configured to derive a fundamental current error by subtracting the generator output current from a sum of a fundamental current reference and the at least one harmonic current reference;
   a third arithmetic element configured to determine a modified fundamental current error as a sum of the fundamental current error and the harmonic reference current deviation; and
   a fundamental current controller adapted to determine the operation parameter reference based on the modified fundamental current error.

2. The arrangement according to claim 1, wherein the operation parameter reference is a voltage reference for controlling the generator side converter portion.

3. The arrangement according to claim 1, wherein the harmonic current reference comprises an oscillation corresponding to N times a fundamental electrical frequency of the generator, wherein N is a natural number larger than 1, wherein the harmonic current reference is different from zero.

4. The arrangement according to claim 1, wherein the operation parameter reference is given in a fundamental dq-frame rotating with the fundamental electrical frequency of the generator.

5. The arrangement according to claim 1, wherein the fundamental current controller comprises two PI-controllers, to determine the operation parameter reference using for each of the d-component and the q-component of the modified fundamental current error in the fundamental dq-frame one PI-controller of the two PI-controllers.

6. The arrangement according to claim 1, wherein the at least one harmonic current controller comprises:
   a transformation module configured to transform the harmonic current error in the fundamental dq-frame into a harmonic dq-frame, the harmonic dq-frame rotating with the respective multiple of the fundamental frequency;
   two PI-controllers configured to receive the components of the harmonic current error in the harmonic positive sequence dq-frame as inputs;
   two other PI-controllers configured to receive the components of the harmonic current error in the harmonic negative sequence dq-frame as inputs;
   a backtransformation module configured to backtransform the outputs of the PI-controllers and the outputs of the other PI-controllers into the fundamental dq-frame; and
   an addition element for adding the transformed outputs of the PI-controllers and the transformed outputs of the two other PI-controllers to obtain the harmonic reference current deviation.

7. The arrangement according to claim 1, further comprising:
   an electrical speed estimator configured and connected to estimate an electrical rotational speed and/or an electrical angle of the generator based on the generator output current and further based on the operation parameter reference.

8. The arrangement according to claim 1, wherein the fundamental current controller and/or the harmonic current controller receives as input the electrical rotational speed and/or an electrical angle estimated by the electrical speed estimator.

9. The arrangement according to claim 1, further comprising:
   at least one harmonic current reference calculation module configured to calculate the harmonic current reference based on at least one current reference input; and/or
   a fundamental current reference calculation module configured to calculate the fundamental current reference based on at least one of the current reference input, wherein the current reference input comprises:
   the operation parameter reference, in particular voltage reference, and/or
   the generator output current, and/or
   a DC-link voltage, and/or
   an electrical frequency of the generator, and/or
   an electrical angle of the generator, and/or
   a torque, and/or
   an acceleration and/or
   a sound pressure.

10. The arrangement according to claim 1, further comprising:
    a dq-abc-transformation module configured to transform the operation parameter reference given in the fundamental dq-frame into a stator frame;
    a modulator configured to derive pulse width modulation signals based on the operation parameter reference given in the stator frame and connected to supply the pulse width modulation signals to gates of controllable switches comprised in the generator side converter portion.

11. The arrangement according to claim 1, further comprising:
    a abc-dq-transformation module configured to transform the generator output current in the stator frame into the fundamental dq-frame.

12. An electric energy system, comprising:
    a generator;
    a converter comprising a generator side converter portion coupled to the generator; and
    the arrangement according to claim 1.

13. A method for determining an operation parameter reference for controlling a generator side converter portion coupled to a generator of a wind turbine, the method comprising:
    deriving at least one harmonic current error by subtracting a generator output current from at least one harmonic current reference;

determining at least one harmonic reference current deviation based on the at least one harmonic current error;

deriving a fundamental current error by subtracting the generator output current from a sum of a fundamental current reference and the at least one harmonic current reference;

determining a modified fundamental current error as a sum of the fundamental current error and the harmonic reference current deviation; and determining the operation parameter reference based on the modified fundamental current error.

14. The method of claim 13, further comprising: controlling the generator side converter portion coupled to the generator based on the operation parameter reference.

* * * * *